United States Patent
Lim et al.

(10) Patent No.: US 6,761,408 B2
(45) Date of Patent: Jul. 13, 2004

(54) LINEAR RECLINER HAVING AN INTERNAL CAM SPRING

(75) Inventors: Kung M. Lim, Newmarket (CA); Pius Ng, Markham (CA)

(73) Assignee: Intier Automotive Inc., Newmarket (CA)

( * ) Notice: Subject to any disclaimer, the term of this patent is extended or adjusted under 35 U.S.C. 154(b) by 0 days.

(21) Appl. No.: 10/277,480

(22) Filed: Oct. 22, 2002

(65) Prior Publication Data

US 2004/0075326 A1 Apr. 22, 2004

(51) Int. Cl.[7] .................................................. B60N 2/22

(52) U.S. Cl. .............................. 297/362.12; 297/362.14

(58) Field of Search ....................... 297/362.12, 362.14, 297/375; 74/575

(56) References Cited

U.S. PATENT DOCUMENTS

| | | |
|---|---|---|
| 3,001,821 A | 9/1961 | Marechal |
| 4,245,866 A | 1/1981 | Bell et al. |
| 4,898,424 A | 2/1990 | Bell |
| 5,052,752 A | 10/1991 | Robinson |
| 5,280,999 A | 1/1994 | Jones et al. |
| 5,299,853 A * | 4/1994 | Griswold et al. ...... 297/362.12 |
| 5,301,569 A | 4/1994 | Droulon |
| 5,320,413 A | 6/1994 | Griswold et al. |
| 5,582,461 A | 12/1996 | Pickles |
| 5,618,083 A | 4/1997 | Martone et al. |
| 5,660,440 A * | 8/1997 | Pejathaya ............. 297/362.12 |

(List continued on next page.)

FOREIGN PATENT DOCUMENTS

| | | |
|---|---|---|
| EP | 0 522 939 A1 | 1/1993 |
| IT | 636325 | 3/1962 |

Primary Examiner—Peter M. Cuomo
Assistant Examiner—Stephen D'Adamo
(74) Attorney, Agent, or Firm—Clark Hill PLC

(57) ABSTRACT

A linear recliner for a vehicle seat assembly providing selectively lockable pivotal adjustment of a seat back pivotally coupled to a seat cushion between a plurality of reclined seating positions. A housing is fixedly secured to the seat cushion. The housing includes a bore extending between front and rear ends of the housing. A chamber is formed within the housing adjacent and open to a portion of the bore. A rod extends between one end pivotally coupled to the seat back and an opposite end slidably carried within the bore of the housing for axial displacement of the rod within the bore during pivotal movement of the seat back. The rod includes a rack of teeth extending towards the chamber. A pawl lockably engagable with the rack of teeth in the rod for preventing axial displacement of the rod within the bore is pivotally coupled to the housing for movement in and out of the locking engagement with the rack of teeth in the rod. The pawl includes an opening extending between opposing and spaced apart upper and lower edges. A step portion and a relief portion define the lower edge. A cam having a primary lobe engagable with the step portion of the lower edge and a secondary lobe engagable with the upper edge is pivotally coupled to the housing for moving the primary and secondary lobes in and out of camming engagement with the step portion and upper edge, respectively. While engaged with the step portion, the primary lobe of the cam maintains the pawl lockably engaged with the rack of teeth in the rod. During manual rotation of the cam, the secondary lobe engages the upper edge to move the pawl out of locking engagement with the rack of teeth in the rod when the primary lobe disengages the step portion and extends towards the relief portion. An internal spring extends between one end fixedly secured to the pawl and an opposite end fixedly secured to the cam. The internal spring simultaneously and continuously biases the pawl towards locking engagement with the rack of teeth in the rod and the primary lobe of the cam towards camming engagement with the step portion.

11 Claims, 3 Drawing Sheets

U.S. PATENT DOCUMENTS

| | | |
|---|---|---|
| 5,707,112 A | 1/1998 | Zinn |
| 5,709,133 A | 1/1998 | Coggon et al. |
| 5,718,482 A | 2/1998 | Robinson |
| 5,727,847 A | 3/1998 | Martone et al. |
| 5,769,493 A * | 6/1998 | Pejathaya .............. 297/362.12 |
| 5,775,776 A | 7/1998 | Schooler et al. |
| 5,823,622 A | 10/1998 | Fisher, IV et al. |
| 5,871,259 A | 2/1999 | Gehart |
| 5,899,533 A * | 5/1999 | Tatematsu et al. .......... 297/367 |
| 5,918,939 A * | 7/1999 | Magadanz ............. 297/378.12 |
| 5,979,986 A | 11/1999 | Pejathaya |
| 5,984,412 A | 11/1999 | Magyar |
| 6,017,090 A | 1/2000 | Bonk |
| 6,039,399 A | 3/2000 | Whalen et al. |
| 6,095,609 A | 8/2000 | Magadanz |
| 6,155,644 A | 12/2000 | Rogala |
| 6,161,657 A | 12/2000 | Zhuang et al. |
| 2002/0079729 A1 * | 6/2002 | Bonk ........................ 297/375 |

\* cited by examiner

US 6,761,408 B2

LINEAR RECLINER HAVING AN INTERNAL CAM SPRING

BACKGROUND OF THE INVENTION

1. Field of the Invention

The invention relates to a linear recliner for an automotive vehicle seat that allows pivotal adjustment of a seat back relative to a seat cushion.

2. Description of the Prior Art

Automotive vehicles include seat assemblies for supporting occupants within the vehicle. Seat assemblies typically include a seat cushion and a seat back pivotally coupled to the seat cushion by a pivot pin for pivotal adjustment of the seat back relative to the seat cushion between a plurality of reclined seating positions. It is well known in the seating art to provide a linear-type recliner mechanism for providing selective, lockable adjustment of the seat back between any one of the plurality of reclined seating positions.

Linear recliners typically include a housing fixedly secured to the seat cushion. A rod or rack extends between one end pivotally coupled to the seat back below the pivot pin and an opposite end slidably carried in the housing for axial displacement within the housing during pivotal movement of the seat back about the pivot pin relative to the seat cushion. The rack typically includes a plurality of teeth formed on one side of the rack. A toothed pawl lockably engagable with the teeth in the rack is pivotally coupled to the housing for movement in and out of locking engagement with the rack. While engaged with the rack, the pawl prevents axial movement of the rack within the housing, and thereby, prevents pivotal movement of the seat back relative to the seat cushion. When the pawl is disengaged with the rack, the rack is allowed to slide axially within the housing and the seat back is allowed to pivot relative to the seat cushion. Typically, a lever-actuated cam is pivotally coupled to the housing for manually actuating the pawl in and out of engagement with the rack. A biasing member commonly extends between the cam and housing for biasing the pawl towards engagement with the rack. It is also known to include a help spring or second biasing member extending between the pawl and housing for biasing the pawl towards engagement with the rack. An example of such a linear recliner mechanism is shown in the U.S. Pat. 6,161,657, which issued to Zhuang et al. on Dec. 19, 2000.

It remains desirable to provide a simplified linear recliner design that utilizes a single biasing member for biasing the pawl towards locking engagement with the rack.

SUMMARY OF THE INVENTION

According to one aspect of the invention, there is provided a linear recliner assembly for a vehicle seat assembly for providing selective and lockable angular adjustment of a seat back pivotally coupled to a seat cushion. The linear recliner assembly includes a housing fixedly secured to the seat cushion. A rod extends between one end pivotally coupled to the seat back and an opposite end slidably carried within the housing for axial displacement therein during pivotal movement of the seat back relative to the seat cushion. The rod includes a rack of teeth formed therein. A pawl having a rack of teeth lockably engagable with the rack of teeth in the rod to prevent axial displacement of the rod within the housing is pivotally coupled to the housing for pivotal movement in and out of locking engagement with the rack of teeth in the rod. A cam is pivotally coupled with the housing and engagable with the pawl for moving the pawl in and out of locking engagement with the rod. An internal spring extends between the pawl and the cam for simultaneously biasing the pawl towards locking engagement with the rod and biasing the cam towards camming engagement with the pawl to urge the pawl towards locking engagement with the rod.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
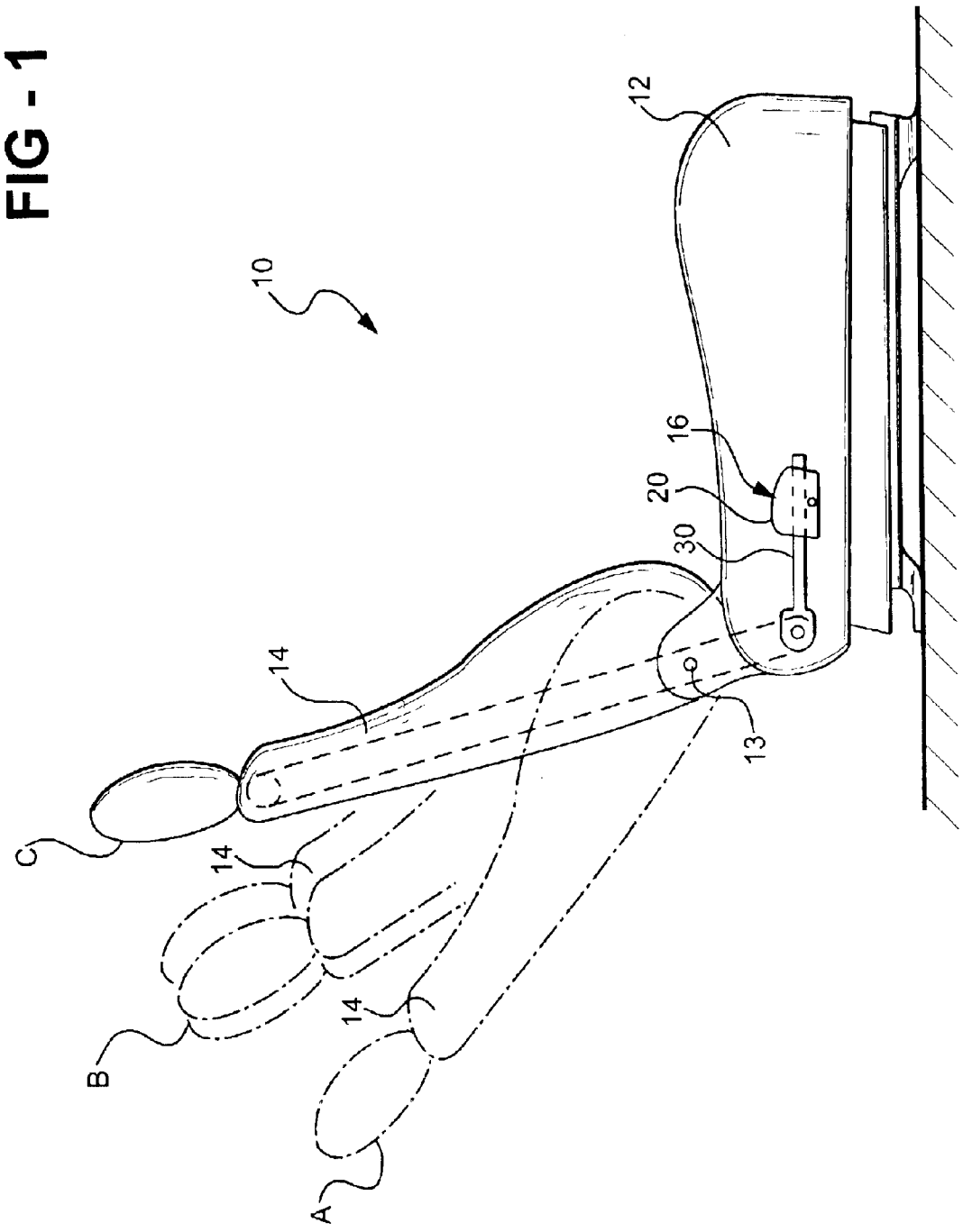
FIG. 1 is a side view of a seat assembly incorporating a linear recliner according to one aspect of the present invention.

Referring to the figures, FIG. 1 illustrates a seat assembly 10 for an automotive vehicle incorporating an embodiment of the invention. The seat assembly 10 includes a seat cushion 12 secured to the floor of the vehicle and a seat back 14 pivotally coupled to the seat cushion 12 by a pivot pin 13 for pivotal movement of the seat back 14 relative to the seat cushion 12. A recliner mechanism 16 is operatively coupled between the seat cushion 12 and the seat back 14. Described in detail below, the recliner mechanism 16 allows for selective pivotal adjustment of the seat back 14 relative to the seat cushion 12 between a full rearward seating position A, a full forward seating position C and a plurality of reclined seating positions B therebetween.

Figure 2:
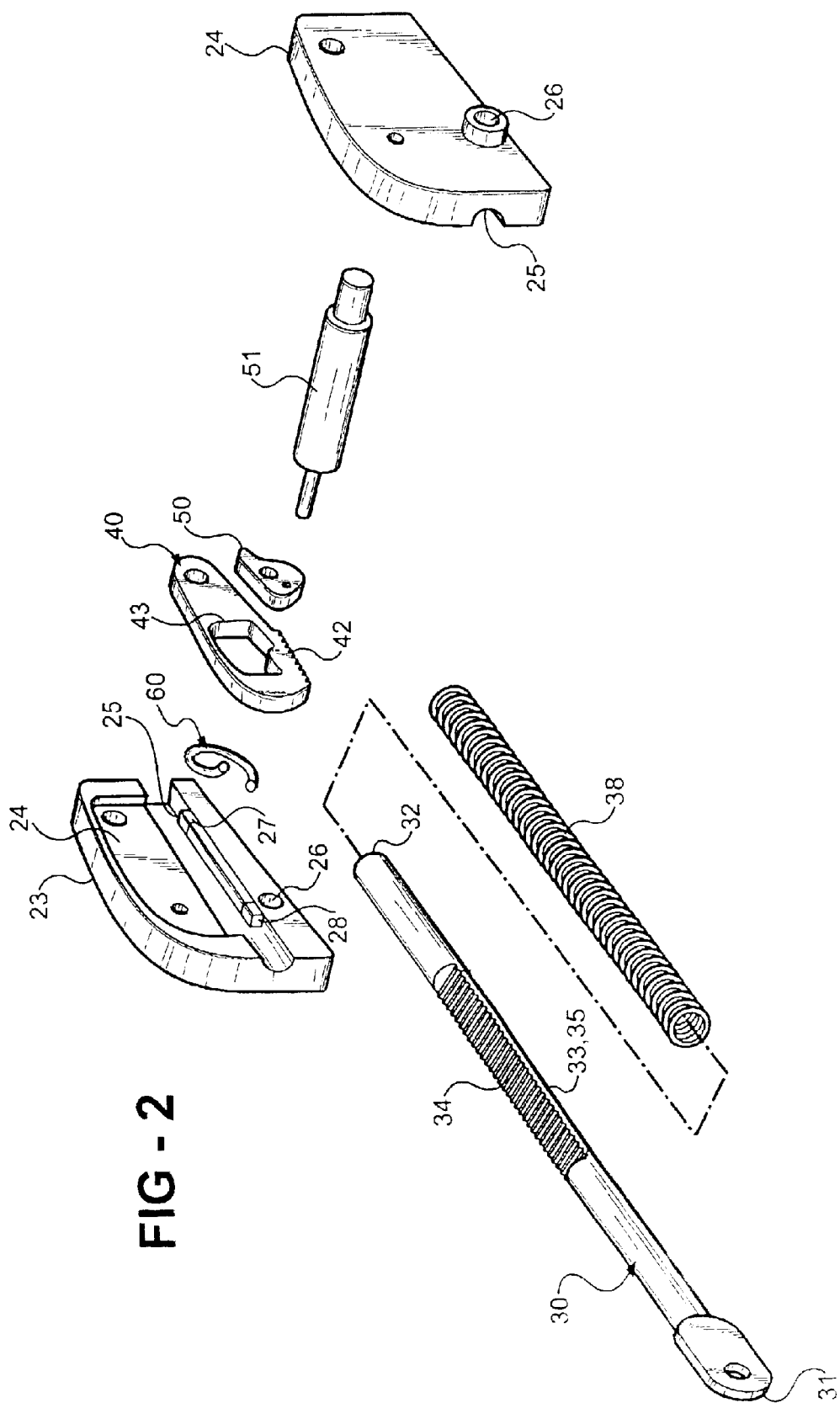
FIG. 2 is an exploded perspective view of the linear recliner.
Figure 3:
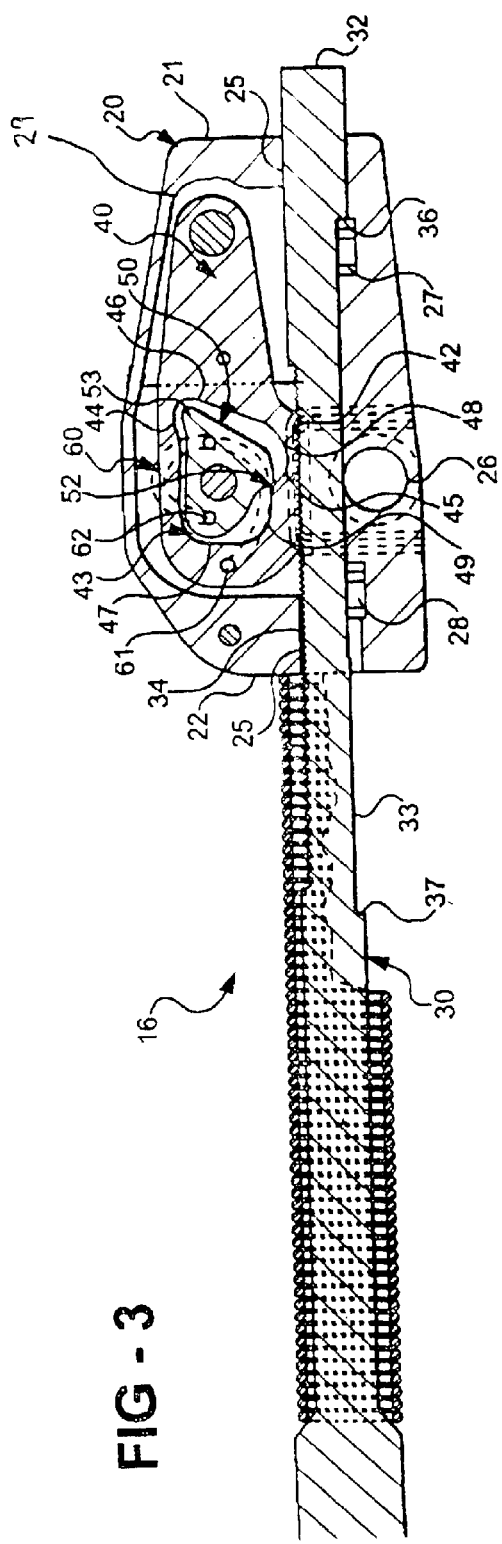
FIG. 3 is a partial cross-sectional view of the linear recliner with the seat back in a full rearward seating position.
Figure 4:
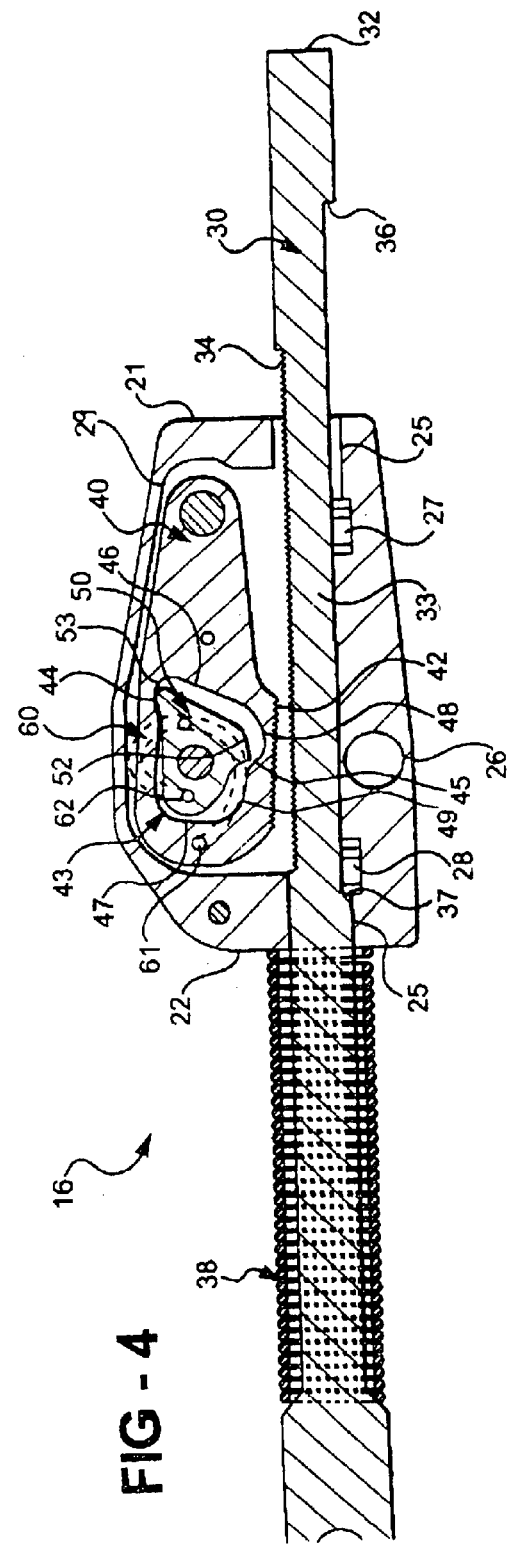
FIG. 4 is a partial cross sectional view of the linear recliner with the seat back in a full forward seating position.

Referring to FIGS. 2–4, the recliner mechanism 16 includes a housing 20 extending between opposite front and rear ends 21, 22 and laterally between symmetrically opposite inner and outer halves 23, 24. A chamber 29 is formed within the housing 20 between the inner and outer halves 23, 24. A generally cylindrical bore 25 extends axially between and through the front and rear ends 21, 22 of the housing 20. The bore 25 opens to the chamber 29 generally between the front and rear ends 21, 22 of the housing 20. A hole 26 is formed laterally through both the inner and outer halves 23, 24 for mounting the housing 20 to the seat cushion 12 with a bolt, or other suitable attachment means, such as a rivet. The inner and outer halves 23, 24 of the housing 20 are fixedly secured together by rivets or by other suitable means, such as welding or bolts.

A rod 30 extends axially between a first end 31, an opposite second end 32, and an intermediate portion 33 therebetween. The first end 31 of the rod 30 is pivotally assembled to the seat back 14. The intermediate portion 33 is slidably carried within the bore 25 of the housing 20. The intermediate portion 33 slides axially through the bore when the seat back 14 is pivoted between the plurality of reclined seating positions. A rack of teeth 34 is formed along the intermediate portion 33 extending outwardly from the rod 30 towards the chamber 29. A cutout 35 is formed in the rod 30 opposite the rack of teeth 34 to present fore and aft abutment edges 36, 37. The front abutment edge 36 is engagable with a front stop 27 fixedly secured to the housing 20, as shown in FIG. 3, for limiting forward pivotal motion of the seat back 14 about the pivot pin 13. The rear abutment edge 37 is engagable with a rear stop 28 spaced apart from the front stop 27 and fixedly secured to the housing 20, as shown in FIG. 4, for limiting rearward pivotal motion of the seat back 14 about the pivot pin 13. A helical coil spring 38 is compressed between the first end 31 of the rod 30 and the housing 20. The spring 38 axially biases the rod 30 relative to die housing 20 in the direction of the first end 31, and thereby, biases the seat back 14 towards the full forward seating position C.

The recliner mechanism 16 includes a pawl 40 having a rack of teeth 42 lockably engagable with the rack of teeth 34 in the rod 30 to prevent axial movement of the rod 30 within the bore 25 and to prevent pivotal movement of the seat back 14 relative to the seat cushion 12 about the pivot pin 13. The pawl 40 is pivotally coupled between the inner and outer halves 23, 24 of the housing 20 and nested within the chamber 29 for pivotal movement therein. The pawl 40 is pivotally movable within the chamber 29 between locked and unlocked positions relative to the rod 30. In the locked position, the rack of teeth 42 in the pawl 40 are lockably engaged with the rack of teeth 34 in the rod 30 to lock the seat back 14 in one of the plurality of reclined seating positions. In the unlocked position, the rack of teeth 42 in the pawl 40 are disengaged with the rack of teeth 34 in the rod 30 to allow axial displacement of the rod 30 within the bore 25 and pivotal adjustment of the seat back 14 relative to the seat cushion 12 about the pivot pin 13.

A window or opening 43 is formed in the pawl 40 extending between spaced apart and opposing upper and lower edges 44, 45 and front and rear edges 46, 47. The lower edge 45 extends between a relief portion 48 adjacent the front edge 46 and a step portion 49 adjacent the rear edge 47.

A cam 50 is nested within the opening 43 and includes a primary lobe 52 engagable with the lower edge 45 of the opening 43. A pivot rod 51 is pivotally coupled between the inner and outer halves 23, 24 of the housing 20. The cam 50 is fixedly secured to the pivot rod 51 for pivotal movement therewith for moving the primary lobe 52 between engagement with the relief portion 48 and the step portion 49 of the lower edge 45. While engaged with the step portion 49, the primary lobe 52 of the cam 50 maintains the pawl 40 in the locked position. With the primary lobe 52 disengaged with the step portion 49 and extending towards the relief portion 48, the pawl 40 is movable to the unlocked position. The cam 50 also includes a secondary lobe 53 engagable with the upper edge 44 of the opening 43. When the primary lobe 52 is pivoted from engagement with the step portion 49 towards the relief portion 48, the secondary lobe 53 simultaneously pushes against the upper edge 44 of the opening 43 to move the pawl 40 towards the unlocked position. Thus, movement of the cam 50 between engagement with the step and relief portions 49, 48 moves the pawl 40 between the locked and unlocked positions, respectively. A release lever may be fixedly secured to a distal end of the pivot rod 51 for manually moving the primary lobe 52 of the cam 50 in and out of engagement with the step portion 49 and the pawl 40 between the locked and unlocked positions.

An internal spring 60 is coiled between the cam 50 and the pawl 40 for biasing the cam 50 toward engagement with the step portion 49 and for biasing the pawl 40 towards the locked position. More specifically, the internal spring 60 includes a first end 61 fixedly secured to the pawl 40 adjacent the front edge 46 of the opening 43 and a second end 62 fixedly secured to the cam 50. As viewed in the figures, the internal spring 60 is tensioned between the cam 50 and pawl 40 to bias the cam 50 clockwise towards engagement with the step portion 49 and to bias the pawl 40 counterclockwise towards the locked position.

In operation, the angular position of the seat back 14 relative to the seat cushion 12 is locked by the recliner mechanism 16 when the pawl 40 is in the locked position. To adjust the angular position of the seat back 14, the cam 50 is moved counterclockwise, as viewed in the figures, so that the primary lobe 52 moves out of engagement with the step portion 49. As the primary lobe 52 moves towards the relief portion 48, the secondary lobe 53 contacts the upper edge 44 of the opening 43 to urge the pawl 40 towards the unlocked position against the force applied by the internal spring 60. In the unlocked position, The rack of teeth 42 on the pawl 40 are disengaged from the rack of teeth 34 on the rod 30 to allow axial displacement of the rod 30 within the bore 25 and pivotal movement of seat back 14 relative to the seat cushion 12 about the pivot pin 13. Clockwise or counterclockwise pivotal movement of the seat back 14 about the pivot pin 13 causes rearward and forward axial displacement of the rod 30 within the bore 25. While the pawl 40 is in the unlocked position, forward axial displacement of the rod 30 within the bore 25 is limited by engagement between the front abutment edge 36 and the front stop 27, as shown in FIG. 3. Similarly, rearward axial displacement of the rod 30 within the bore 25 is limited by engagement between the rear abutment edge 37 and the rear stop 28, as shown in FIG. 4. While adjusting the angular position of the seat back 14, the cam 50 must be continuously held in the counterclockwise direction against the bias of the internal spring 60 to maintain the secondary lobe 53 engaged with the upper edge 44 and the pawl 40 in the unlocked position.

Once the seat back 14 has been adjusted to a desired one of the reclined seating positions, the cam 50 is allowed to pivot clockwise so that the secondary lobe 53 falls out of engagement with the upper edge 44 and, at the same time, the primary lobe 52 engages the step portion 49. The internal spring 60 forces engagement of the primary lobe 52 with the step portion 49. Both the engagement of the primary lobe 52 with the step portion 49 and the force applied by the internal spring 60 upon the pawl 40 forces the pawl 40 into the locked position. In the locked position, the rack of teeth 42, 34 of the pawl 40 and the rod 30 are lockably engaged to maintain the seat back 14 in the desired reclined seating position.

The invention has been described in an illustrative manner, and it is to be understood that the terminology, which has been used, is intended to be in the nature of words of description rather than of limitation.

Many modification and variations of the present invention are possible in light of the above teachings. It is, therefore, to be understood that within the scope of the appended claims, the invention may be practiced other than as specifically described.

What is claimed is:

1. A linear recliner assembly for a vehicle seat assembly for providing selective and lockable angular adjustment of a seat back pivotally coupled to a seat cushion, said linear recliner assembly comprising:

a housing adapted to be fixedly secured to the seat cushion;

a rod extending between one end adapted to be pivotally coupled to the seat back and an opposite end slidably carried within the housing for axial displacement therein during pivotal movement of the seat back relative to the seat cushion, said rod including a rack of teeth formed therein;

a pawl having a rack of teeth lockably engagable with said rack of teeth in said rod to prevent axial displacement of said rod within said housing and pivotally assembled to said housing for pivotal movement in and out of locking engagement with said rack of teeth in said rod, said pawl having an opening therein extending between an upper edge and an opposing lower edge spaced apart from said upper edge;

a cam seated within said opening of said pawl and between said upper and lower edges for camming engagement therewith, said cam pivotally coupled to said housing and engagable with said pawl for moving said pawl between engagement and disengagement with said rack of teeth in said rod; and an internal spring coiled between said pawl and said cam and including a first end fixedly secured to said pawl and a second end fixedly secured to said cam for simultaneously biasing said pawl towards locking engagement with said rod and biasing said cam towards camming engagement with said pawl to continuously urge said pawl towards locking engagement with said rack of teeth in said rod.

2. A linear recliner assembly as set forth in claim 1 wherein said lower edge of said opening includes a step portion engagable with said cam to maintain said pawl in locking engagement with said rack of teeth in said rod.

3. A linear recliner assembly as set forth in claim 2 wherein said lower edge of said opening includes a relief portion adjacent said step portion and further spaced apart from said upper edge than said step portion and engagable with said cam to allow movement of said pawl in and out of locking engagement with said rack of teeth in said rod.

4. A linear recliner assembly as set forth in claim 3 wherein said cam includes a primary lobe cammingly engagable said step portion to maintain said pawl in locking engagement with said rack of teeth in said rod.

5. A linear recliner assembly as set forth in claim 4 wherein said primary lobe is engagable with said relief portion to allow movement of said pawl in and out of locking engagement with said rack of teeth in said rod.

6. A linear recliner assembly as set forth in claim 5 wherein said primary lobe is movable between camming engagement with said step portion and engagement with said relief portion of said lower edge during reciprocal pivotal movement of said cam relative to said housing.

7. A linear recliner assembly as set forth in claim 6 wherein said cam further includes a secondary lobe engagable with said upper edge for moving said pawl out of engagement with said rack of teeth in said rod during movement of said primary lobe between camming engagement with said step portion and engagement with said relief portion of said lower edge.

8. A linear recliner assembly as set forth in claim 7 wherein said housing includes inner and outer halves and a cavity defined between said inner and outer halves for supporting said pawl therein during movement of said pawl in and out of locking engagement with said rack of teeth in said rod.

9. A linear recliner assembly as set forth in claim 8 wherein said housing includes a bore for slidably carrying said end of said rod having said rack of teeth formed therein, said bore extending into said chamber for allowing locking engagement between said rack of teeth of said pawl and said rod.

10. A linear recliner assembly as set forth in claim 9 wherein said rod includes fore and aft abutment edges for engaging front and rear stop, respectively, fixedly secured to said housing for limiting pivotal movement of said seat back relative to said seat cushion.

11. A linear recliner assembly as set forth in claim 10 including a coil spring extending between said rod and said housing for axially biasing said rod during axial displacement of said rod within said bore, whereby said seat back is pivotally biased relative to said seat cushion.

* * * * *